United States Patent
Kwon et al.

(10) Patent No.: US 10,367,544 B2
(45) Date of Patent: Jul. 30, 2019

(54) APPARATUS AND METHOD FOR SEARCHING FOR CELL IN WIRELESS TERMINAL

(71) Applicant: Samsung Electronics Co., Ltd., Gyeonggi-do (KR)

(72) Inventors: Dae-Cheol Kwon, Seoul (KR); Jong-Han Kim, Gyeonggi-do (KR); Jae-Hyung Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 251 days.

(21) Appl. No.: 15/148,610

(22) Filed: May 6, 2016

(65) Prior Publication Data

US 2016/0330724 A1    Nov. 10, 2016

(30) Foreign Application Priority Data

May 6, 2015    (KR) .................. 10-2015-0062995
Apr. 19, 2016    (KR) .................. 10-2016-0047759

(51) Int. Cl.
*H04B 1/7115*    (2018.01)
*H04B 1/7083*    (2011.01)
*H04W 48/16*    (2009.01)

(52) U.S. Cl.
CPC ......... *H04B 1/7115* (2013.01); *H04B 1/7083* (2013.01); *H04W 48/16* (2013.01)

(58) Field of Classification Search
None
See application file for complete search history.

(56) References Cited

U.S. PATENT DOCUMENTS

| | | | |
|---|---|---|---|
| 2002/0181559 A1* | 12/2002 | Heidari-Bateni | H04B 1/711 375/148 |
| 2003/0083016 A1* | 5/2003 | Evans | H04B 7/0608 455/67.11 |
| 2011/0028106 A1 | 2/2011 | Lee et al. | |
| 2015/0010099 A1 | 1/2015 | Lin et al. | |

* cited by examiner

*Primary Examiner* — James P Duffy
(74) *Attorney, Agent, or Firm* — The Farrell Law Firm, P.C.

(57) ABSTRACT

Methods and apparatuses are provided for searching for a cell by a communication processor (CP) of a wireless terminal having a plurality of antennas. One of the plurality of antennas is selected based on whether a secondary antenna is in a driving state and whether a finger of a rake receiver has been allocated. The plurality of antennas includes a primary antenna and the secondary antenna. A cell search is performed through the selected one of the plurality of antennas.

16 Claims, 4 Drawing Sheets

APPARATUS AND METHOD FOR SEARCHING FOR CELL IN WIRELESS TERMINAL

PRIORITY

This application claims priority under 35 U.S.C. § 119(a) to Korean Patent Applications filed on May 6, 2015 and Apr. 19, 2016 in the Korean Intellectual Property Office and assigned Serial Nos. 10-2015-0062995 and 10-2016-0047759 respectively, the contents of each of which are incorporated herein by reference.

BACKGROUND

1. Field of the Disclosure

The present disclosure relates generally to an apparatus and a method for selecting an antenna for a cell search in a wireless terminal.

2. Description of the Related Art

In order to meet wireless traffic demands, which have increased since deployment of $4^{th}$-generation (4G) communication systems, efforts have been made to develop an improved $5^{th}$-generation (5G) or pre-5G communication system. The 5G or pre-5G communication system is also referred to as a "Beyond 4G Network" communication system or a "Post LTE" system.

The 5G communication system is implemented in higher frequency (mmWave) bands, e.g., 60 GHz bands, so as to accomplish higher data rates. To decrease propagation loss of radio waves and increase transmission distance in the higher frequency bands, beamforming, massive multiple-input multiple-output (MIMO), full dimensional MIMO (FD-MIMO), an array antenna, analog beamforming, and large scale antenna techniques have been developed in 5G communication systems.

In addition, in 5G communication systems, technological development for system network improvement is under way based on advanced small cells, cloud radio access networks (RANs), ultra-dense networks, device-to-device (D2D) communication, wireless backhaul, moving networks, cooperative communication, coordinated multi-points (CoMP), reception-end interference cancellation, and the like.

Also in a 5G system, hybrid frequency shift keying (FSK) and quadrature amplitude modulation (QAM) (FQAM) and sliding window superposition coding (SWSC) have been developed as advanced coding modulation (ACM), and filter bank multi carrier (FBMC), non-orthogonal multiple access (NOMA), and sparse code multiple access (SCMA) have been developed as an advanced access technology.

Generally, a wireless terminal needs to search for a cell to initially access in a network, or for synchronization with an adjacent cell (also referred to as a "neighboring cell") to support mobility and to measure reception quality. The wireless terminal determines a target cell to attempt to initially access by evaluating the reception quality, or determines whether to perform a handover or cell reselection by evaluating the reception quality of a current cell (also referred to as a "serving cell") and the reception quality of at least one neighboring cell. For example, handover may be performed by the wireless terminal in a mode RRC_CONNECTED (e.g., an active state), and the cell reselection may be performed by the wireless terminal in a mode RRC_IDLE (e.g., an idle state).

When determining the target cell to attempt to initially access, or when measuring the reception quality for handover or cell reselection, a wireless terminal using a single antenna does not require antenna selection. However, for a wireless terminal using multiple antennas, an antenna to be used for measurement of the reception quality may be an important factor in determining communication quality.

For example, for a wireless terminal supporting reception (Rx) diversity based on multiple antennas in a good wireless communication environment, such as a strong electric-field environment, antenna selection may have minimal effect on communication quality. That is, when the wireless terminal uses the multiple antennas, a procedure for antenna selection may not be required in the strong electric-field environment.

However, for a wireless terminal supporting Rx diversity based on multiple antennas in a poor wireless communication environment, such as a weak electric-field environment, antenna selection may have a great impact on communication quality. That is, when the wireless terminal uses the multiple antennas, success or failure of a cell search may depend on a selected antenna in the weak electric-field environment. For example, a wireless terminal having two antennas may fail in a cell search with a second antenna despite succeeding in a cell search with a first antenna when reception quality in a particular cell is measured as good by the first antenna and is measured as poor by the second antenna.

To solve this problem, in the weak electric-field environment, all paths that may be obtained in the multiple antennas may be activated and a search may be performed corresponding to each of the paths, thus improving search performance. In this case, however, time and power consumed for the search may increase.

SUMMARY

An aspect of the present disclosure provides an apparatus and a method for selecting an antenna to measure a signal quality in a cell in a weak electric-field environment.

According to an aspect of the present disclosure, a wireless terminal is provided that includes a plurality of antennas comprising a primary antenna and at least one secondary antenna. The wireless terminal also includes a communication processor (CP) configured to select one of the plurality of antennas based on whether at least one from among the at least one secondary antenna is in a driving state and whether a finger of a rake receiver has been allocated, and to perform a cell search through the selected one of the plurality of antennas.

According to another aspect of the present disclosure, a method is provided for searching for a cell by a CP of a wireless terminal having a plurality of antennas. The plurality of antennas comprises a primary antenna and at least one secondary antenna. One of the plurality of antennas is selected based on whether at least one from among at least one secondary antenna is in a driving state and whether a finger of a rake receiver has been allocated. A cell search is performed through the selected one of the plurality of antennas.

According to another aspect of the present disclosure, a method is provided for searching for a cell by a CP of a wireless terminal having a plurality of antennas. It is determined whether a secondary antenna is in a driving state. The plurality of antennas includes a primary antenna and the secondary antenna. The primary antenna is selected and a cell search is performed through the primary antenna, when the secondary antenna is not in the driving state. One of the plurality of antennas is selected based on whether a finger of a rake receiver has been allocated, and based on an operation state of the wireless terminal, and the cell search is performed through the selected one of the plurality of antennas, when the secondary antenna is in the driving state.

According to another aspect of the present disclosure, a wireless terminal is provided that includes a plurality of antennas having a primary antenna and a secondary antenna. The wireless terminal also includes a CP configured to determine whether a secondary antenna of the plurality of antennas is in the driving state, and select the primary antenna and perform a cell search through the primary antenna, when the secondary antenna is not in a driving state. The CP is also configured to select one of the plurality of antennas based on whether a finger of a rake receiver has been allocated, and based on an operation state of the wireless terminal, and perform the cell search through the selected one of the plurality of antennas, when the secondary antenna is in the driving state.

BRIEF DESCRIPTION OF THE DRAWINGS

The above and other aspects, features, and advantages of the present disclosure will be more apparent from the following detailed description when taken in conjunction with the accompanying drawings, in which.

DETAILED DESCRIPTION

Figure 1:
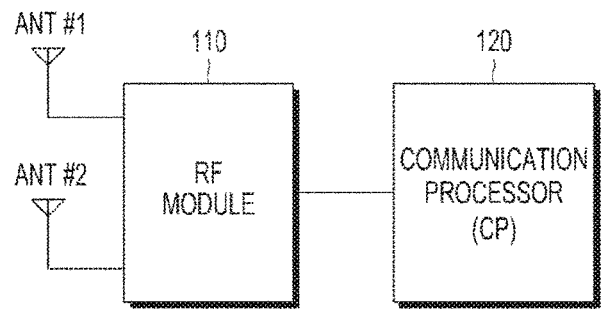
FIG. 1 is a block diagram illustrating a wireless terminal, according to an embodiment of the present disclosure.

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

Herein, expressions such as "having," "may have," "comprising," and "may comprise" indicate the existence of a corresponding characteristic (such as a numerical value, function, operation, or component), and do not exclude the existence of one or more additional characteristics.

Herein, expressions such as "A or B," "at least one of A and B," or "one or more of A and B" may include all possible combinations of listed items. For example, "A or B," "at least one of A and B," or "one or more of A and B" may include (1) at least one A, (2) at least one B, or (3) at least one A and at least one B.

Expressions such as "first," "second," "primarily," or "secondary," used in various embodiments herein, may represent various elements regardless of order and/or importance and do not limit the corresponding elements. The expressions may be used for distinguishing one element from another element. For example, a first user device and a second user device may represent different user devices regardless of an order or importance. For example, a first element may be referred to as a second element without deviating from the scope of the present disclosure, and similarly, a second element may be referred to as a first element.

When it is described that an element (such as a first element) is "operatively or communicatively coupled" or "connected" to another element (such as a second element), the element can be directly connected to the other element or can be connected to the other element through a third element. However, when it is described that an element (such as a first element) is "directly connected" or "directly coupled" to another element (such as a second element), it means that there is no intermediate element (such as a third element) between the element and the other element.

The expression "configured to (or set)", as used herein, may be used interchangeably with, for example, "suitable for," "having the capacity to," "designed to," "adapted to," "made to," or "capable of", according to the situation. The term "configured to (or set)" does not always mean "specifically designed to" by hardware. Alternatively, in some situations, an expression "apparatus configured to" may mean that the apparatus "can" operate together with another apparatus or component. For example, a phrase "a processor configured (or set) to perform A, B, and C" may be a generic-purpose processor (such as a central processing unit (CPU) or an application processor) that can perform a corresponding operation by executing at least one software program stored at an exclusive processor (such as an embedded processor) for performing a corresponding operation or at a memory device.

Terms defined herein are only used to describe a specific embodiment, and are not intended to limit the scope of other embodiments. A singular form may include a plural form unless it is explicitly differently represented. Technical and scientific terms, used herein, may have the same meanings as those generally understood by a person of common skill in the art. Generally used terms defined in a dictionary have the same meanings as or meanings similar to that of a context of related technology and are not to be analyzed in an ideal or excessively formal manner unless explicitly defined. In some case, terms defined herein cannot be analyzed to exclude the present embodiments.

Generally, in a wireless communication system, a wireless terminal performs an access procedure to access a network. For example, an access procedure in LTE or LTE-A may be performed in a cell search process, a system information obtaining process, a random access process, and a paging process.

The wireless terminal may obtain synchronization with a cell in the network through the cell search process. For example, the cell search process may include obtaining frequency and symbol synchronization for the cell, obtaining frame synchronization for the cell, and then determining a cell identifier (ID) of a physical layer of the cell. The cell ID may be obtained based on a primary synchronization signal (PSS) and a secondary synchronization signal (SSS) that are sent from the cell.

The wireless terminal may obtain cell system information (CSI) through the system information obtaining process. The CSI may define information necessary for communication in the cell.

For example, in LTE, the CSI may include a master information block (MIB) and a system information block (SIB). The MIB may be transmitted using a broadcasting channel (BCH), and the SIB may be transmitted using a downlink shared channel (DL-SCH).

The SIB may be defined according to a type of information included therein. For example, SIB3 may include information about cell reselection, and SIB4 through SIB8 may include information about neighboring cells. Once the CSI is accurately decoded, the wireless terminal may access the cell through the random access process.

In a wireless communication system, as an approach to obtain good communication quality, a cell search and selection procedure may be performed. The cell search and selection procedure may include a series of processes of measuring signal qualities of neighboring cells and selecting at least one target cell based on measurement results.

For example, measurement of the signal qualities may include receiving a reference signal, such as a pilot signal, sent from the neighboring cells, measuring the signal qualities defined by signal-to-noise ratios (SNRs), signal-to-interference plus noise ratios (SINRs), Ec/Io, received signal code powers (RSCPs), and so forth, from the received reference signals, and selecting at least one target cell based on the measured signal qualities. The wireless terminal may select, as a target cell, at least one neighboring cell for which measured signal qualities meet a criterion set in the network.

Even after one cell is selected, the wireless terminal may wake up every discontinuous reception (DRX) cycle in an idle state to measure a signal quality for a selected cell or a neighboring cell thereof. The wireless terminal may determine whether to stay in the cell currently selected based on the measurement results, or reselect a cell for movement to a new cell.

According to an embodiment of the present disclosure, a method is provided in which a wireless terminal, using multiple antennas in a weak electric-field environment, selects an antenna for reception quality measurement for any one of a cell search for determining a target cell to attempt to initially access, a handover for movement to another cell, and cell reselection for selection of a new cell to access.

For example, the wireless terminal may measure a signal quality to determine a target cell to attempt to initially access when powered on, may measure a signal quality to determine whether to perform a handover in the active state, and may measure a signal quality for cell reselection in the idle state.

Therefore, according to an embodiment of the present disclosure, a method is provided in which the wireless terminal, using the multiple antennas in the weak electric-field environment, selects an antenna for measuring a signal quality based on an operation state. For example, whether a finger of a rake receiver in the wireless terminal has been allocated or not may affect signal quality measurement.

Accordingly, a method for antenna selection based on an operation state of the wireless terminal is provided. That is, an antenna for measurement of a received signal must be selected, considering an initial cell search in which the finger has not been allocated, the active state in which the finger is allocated at all times, and the idle state in which the finger is alternately allocated.

For reference, if the operation state is the idle state, the wireless terminal wakes up every DRX cycle to measure a reception quality, and in this case, the finger allocation and deallocation may be repeated in the wake-up cycle.

FIG. 1 is a block diagram illustrating a wireless terminal, according to an embodiment of the present disclosure.

Referring to FIG. 1, the wireless terminal includes two antennas ANT#1 and ANT#2. A radio frequency (RF) module 110 converts an RF-band signal received through the multiple antennas into an intermediate frequency (IF)-band signal, and delivers the IF-band signal to a communication processor (CP) 120. The RF module 110 converts the IF-band signal provided from the CP 120 into the RF-band signal and delivers the RF-band signal to the multiple antennas.

The CP 120 processes a voice signal and data transmitted/received over a wireless network. The CP 120 may include a communication protocol, codec, and so forth. For example, the CP 120 may support a protocol defined in IMS standards of at least one of a session initiation protocol (SIP), a session description protocol (SDP), a real-time transfer protocol (RTP), a real time control protocol (RTCP), a message session relay protocol (MSRP), a real time streaming protocol (RTSP), and a hypertext transfer protocol (HTTP), and a transmission control protocol/Internet protocol (TCP/IP).

The CP 120 may include a rake receiver including multiple fingers, a searcher, an analog-to-digital converter (ADC), a digital-to-analog converter (DAC), a digital signal processor (DSP), and so forth.

The CP 120 selectively sets a communication path using the multiple antennas, or connects or disconnects the communication path based on a set operation mode and set handover conditions.

According to an embodiment of the present disclosure, the CP 120 performs antenna selection based on a current operation state. For example, the CP 120 may perform antenna selection for a cell search, antenna selection for a handover in the active state, and antenna selection for cell reselection in the idle state.

The CP 120 selects one of the multiple antennas, taking into account both the driving of a secondary antenna among the multiple antennas and the allocation of a finger capable of defining the current operation state into. Whether the secondary antenna is in a driving state or not indicates whether a signal received through the secondary antenna may be delivered to the RF module 110 or not. That is, if the secondary antenna is in the driving state, the wireless terminal may connect a path for delivering the signal received through the secondary antenna to the RF module 110. Otherwise, if the secondary antenna is not in the driving state, the wireless terminal may not connect the path for delivering the signal received through the secondary antenna to the RF module 110. For example, the wireless terminal may deliver the signal received through the secondary antenna to the rake receiver, taking into account whether the secondary antenna is in the driving state.

The CP 120 selects an antenna to be used in a cell search, a handover, and cell reselection through the chosen antenna selected from among the multiple antennas. The operation state determines whether the finger of the rake receiver has been allocated. For example, if the operation state is the active state, it may be determined that the finger has been allocated. If the operation state is the idle state or the cell search state, it may be determined that the finger has not been allocated.

More specifically, the CP 120 selects a primary antenna among the multiple antennas as an antenna to be used, if the secondary antenna among the multiple antennas is not in a driving state.

If the secondary antenna among the multiple antennas is in the driving state and the finger has been allocated, the CP 120 determines a candidate antenna from among the multiple antennas. If a signal quality corresponding to the determined candidate antenna satisfies a preset reference signal quality, the CP 120 selects the determined candidate antenna as an antenna to be used. If the signal quality corresponding to the determined candidate antenna fails to satisfy the preset reference signal quality, the CP 120 selects a remaining antenna, excluding the candidate antenna, from among the multiple antennas as an antenna to be used.

If the secondary antenna among the multiple antennas is in the driving state and the finger has not been allocated, the CP 120 determines whether a signal quality of an unchosen antenna which has not been selected for a previous cell search among the multiple antennas is better, by at least one preset criterion, than a signal quality of a chosen antenna, which has been selected for the previous cell search.

If the signal quality of the unchosen antenna is better than the signal quality of the chosen antenna by the at least one preset criterion, the CP 120 may select the unchosen antenna as an antenna to be used. However, if the signal quality of the unchosen antenna is not better than the signal quality of the chosen antenna by the at least one preset criterion, then the CP 120 may use the chosen antenna as the antenna to be used.

Figure 2:
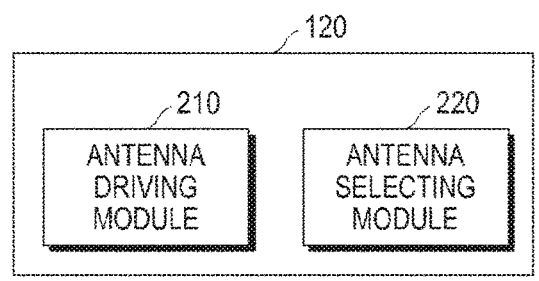
FIG. 2 is a block diagram illustrating a communication processor (CP) of a wireless terminal, according to an embodiment of the present disclosure.

FIG. 2 is a block diagram illustrating the CP included in the wireless terminal, according to an embodiment of the present disclosure.

Referring to FIG. 2, the CP 120 included in the wireless terminal includes an antenna driving module 210 and an antenna selecting module 220.

Herein, the term "module" may refer to, for example, a unit including one of or a combination of two or more of hardware, software, and firmware. The term "module" may be interchangeably used with the terms "unit", "logic", "logical block", "component", or "circuit". A module may be a minimum unit or a portion of an integrated component. A module may be a minimum unit or a portion thereof performing one or more functions. A module may be implemented mechanically or electronically.

For example, a module, according to an embodiment of the present disclosure, may include at least one of an application-specific integrated circuit (ASIC) chip, field-programmable gate arrays (FPGAs), and a programmable-logic device performing certain operations already known or to be developed.

The antenna driving module 210 designates at least two of the multiple antennas as a primary antenna and at least one secondary antenna, and controls driving based on the primary antenna and the at least one secondary antenna.

The antenna selecting module 220 selects an antenna to be used, taking a current operation state into account, to reduce a search time while maintaining search performance in a weak electric-field environment. For example, the antenna selecting module 220 may determine whether to drive the secondary antenna of the multiple antennas at a predetermined point in time, and may select an antenna to be used at a predetermined point in time based on a reception quality (RSCP or the like) measured based on the multiple fingers of the rake receiver.

According to an embodiment of the present disclosure, the antenna selecting module 220 selects an antenna to be used based on an RSCP considering at least one of a received signal strength indicator (RSSI) and quality (Ec/Io). When the selected antenna is used, a probability of succeeding in a search process, by selecting a cell through a cell search and measuring a signal quality for the selected cell, may be improved and an unnecessary cell search may be avoided.

Figure 3:
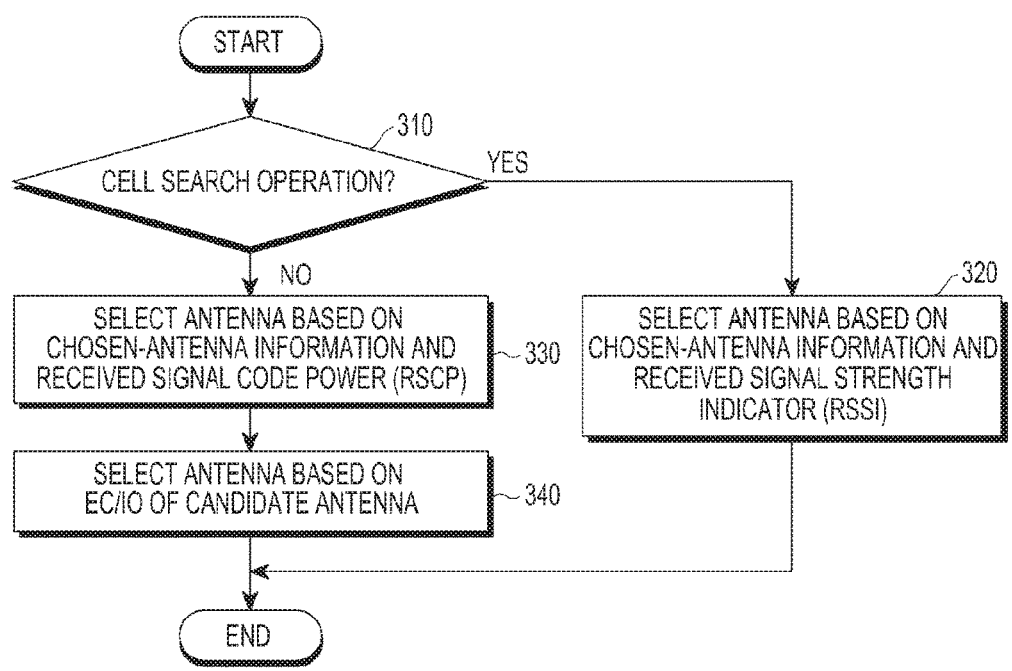
FIG. 3 is a flowchart illustrating an antenna selection procedure by a wireless terminal in a wireless communication, system, according to an embodiment of the present disclosure.

FIG. 3 is a flowchart illustrating an antenna selection procedure by the wireless terminal in the wireless communication system, according to an embodiment of the present disclosure.

Referring to FIG. 3, the wireless terminal determines whether the current operation state is the cell search state, in step 310. For example, when powered on, the wireless terminal may determine that the current operation state is the cell search state.

When the current operation state is the cell search state, the wireless terminal selects an antenna for a cell search based on chosen-antenna information and RSSIs of antennas of the multiple antennas, in step 320.

If the current operation state is not the cell search state, the wireless terminal selects an antenna for a handover or cell reselection based on the chosen-antenna information, RSCP, and Ec/Io. An operation state for selecting an antenna for a handover may be the active state. An operation state for selecting an antenna for cell reselection may be the idle state.

For example, the wireless terminal may select a candidate antenna from among the multiple antennas based on the chosen-antenna information and the RSCP, in step 330, and may select an antenna based on Ec/Io of the selected candidate antenna, in step 340.

Figure 4A:
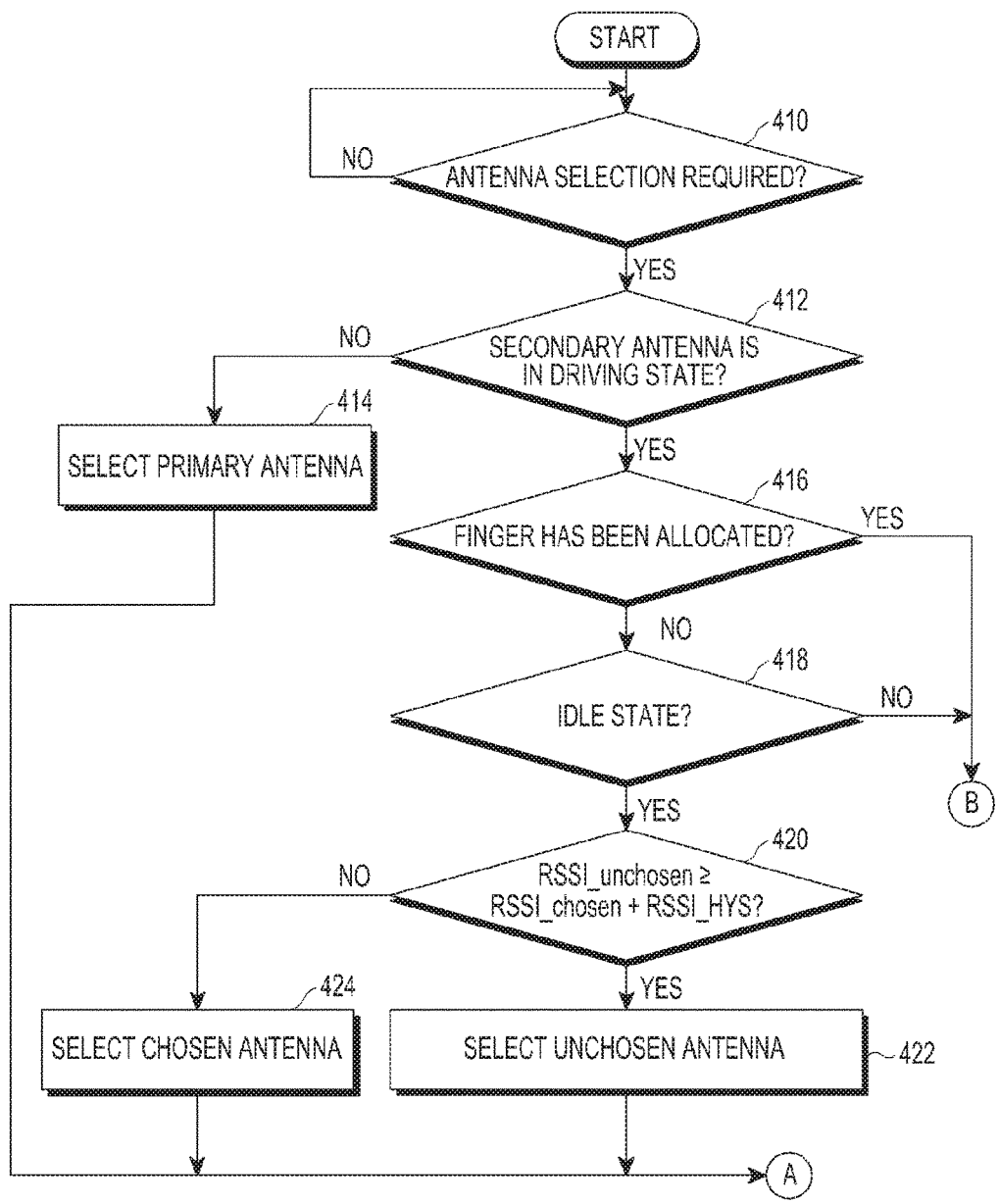
FIGS. 4A and 4B are flowcharts illustrating a control flow for selecting an antenna by a wireless terminal in a weak electric-field environment, according to an embodiment of the present disclosure.
Figure 4B:
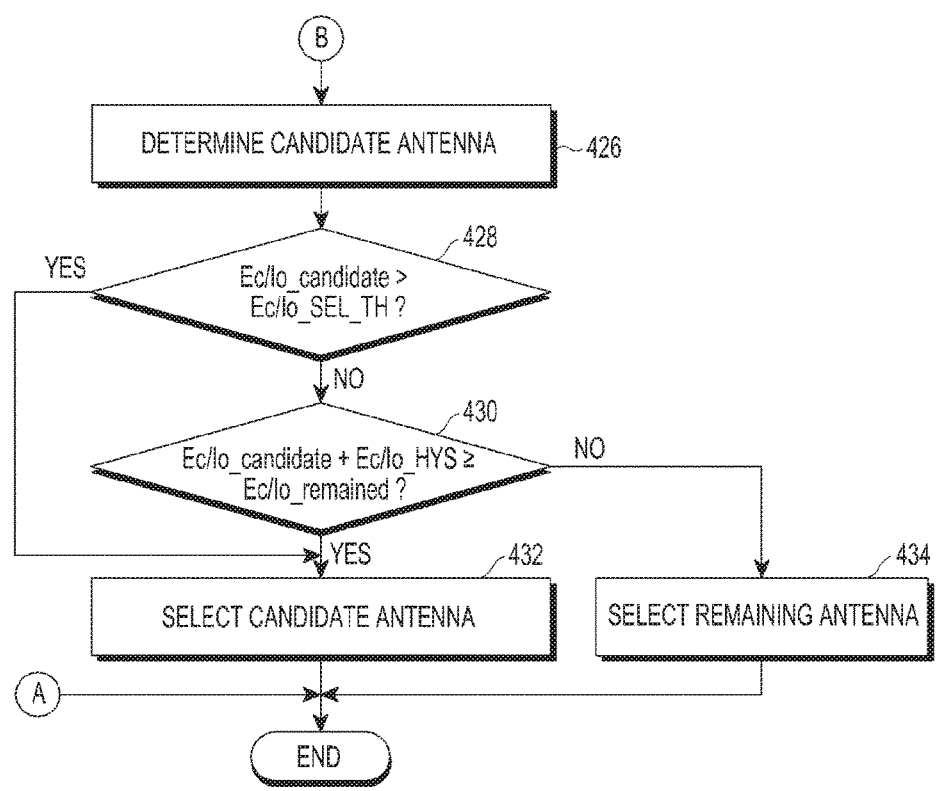

FIGS. 4A and 4B are flowcharts illustrating a control flow for selecting an antenna by the wireless terminal in the weak electric-field environment, according to an embodiment of the present disclosure.

Referring to FIGS. 4A and 4B, the wireless terminal determines whether antenna selection is required, in step 410. The wireless terminal may consider a current communication environment before determining whether antenna selection is required. That is, the wireless terminal may determine whether antenna selection is required, if the current communication environment is the weak electric-field environment.

Antenna selection may be required in an initial cell search procedure, a handover procedure, and a cell reselection procedure. The initial cell search procedure may be performed when the wireless terminal is powered on, and the handover procedure may be performed to support mobility when the operation state of the wireless terminal is the active state. The cell reselection procedure may be performed to search for a neighboring cell when the wireless terminal wakes up from the idle state every DRX cycle. Antenna selection in each of the three above-described procedures may have the same purpose for efficiently measuring a strength of a received signal.

The wireless terminal determines a point in time to select an antenna for each operation state. That is, in the idle state and the active state, antenna selection may be performed when the finger is allocated, and in the initial cell search procedure, antenna selection may be performed when the finger is not allocated.

For example, in the idle state, the wireless terminal may primarily select an antenna when waking up to identify a paging indication channel (PICH) in a previous DRX cycle. When the wireless terminal wakes up to identify the PICH, a finger has already been allocated, such that the wireless terminal may obtain an antenna-specific RSCP. If a secondary antenna is turned on when a searcher is driven to measure a strength of a received signal, the wireless terminal may select the primarily selected antenna. On the other hand, if the secondary antenna is turned off when the searcher is driven to measure a strength of a received signal, the wireless terminal may select the primary antenna.

For example, in the active state or the initial cell search procedure, the wireless terminal may select an antenna to be used when the searcher is driven to measure a strength of a received signal.

Referring back to FIG. 4A, if it is time to select an antenna, the wireless terminal determines whether a secondary antenna, among the multiple antennas, is in a driving state, in step 412. The secondary antenna may be the remaining antenna, that is, a non-used antenna, among the multiple antennas, excluding the primary antenna that the wireless terminal uses in the active state.

According to an embodiment of the present disclosure, in the active state (e.g., "Cell_DCH state"), the wireless terminal monitors a signal quality (RSCP, Ec/Io, or the like) in a primary path based on the primary antenna every predetermined cycle, and drives the secondary antenna when the monitored signal quality does not satisfy a preset criterion. The wireless terminal measures a signal quality in the primary path through a finger corresponding to the primary path among multiple fingers of the rake receiver. The preset criterion may correspond to a case when the measured signal quality fails to satisfy a reference value. That is, the wireless terminal may supply operating power to the secondary antenna when an RSCP measured for the primary path is less than a preset reference value RSCP_DIVON_TH, or when Ec/Io measured for the primary path is less than a preset reference value Ec/Io_DIVON_TH. In this case, in order to supply an operating voltage to the secondary antenna, it is not necessary to determine whether the two conditions are satisfied.

According to an embodiment of the present disclosure, in the idle state, the wireless terminal may determine whether to drive the secondary antenna based on the signal quality (RSSI or the like) in the primary path, based on the primary antenna in a DRX cycle. The wireless terminal measures the signal quality in the primary path through the finger corresponding to the primary path among the multiple fingers of the rake receiver.

For example, the wireless terminal wakes up every DRX cycle, and supplies operating power to the secondary antenna when the RSSI measured in the primary path is less than a preset reference value RSSI_DIVON_TH, or when the RSCP measured in the primary path in a previous DRX cycle is less than a preset reference value RSCP_DIVON_TH, or when Ec/Io measured in the primary path in the previous DRX cycle is less than a preset reference value Ec/Io_DIVON_TH. In this case, to supply an operating voltage to the secondary antenna, it may be determined whether at least one of the proposed conditions, rather than all of the proposed conditions, is satisfied.

According to an embodiment of the present disclosure, in the initial cell search procedure, none of the fingers of the rake receiver has been allocated, such that the wireless terminal may drive the secondary antenna if an antenna used in a previous active state is the secondary antenna, or if the signal quality measured in the current primary path based on the primary antenna does not satisfy a preset reference value.

For example, in the initial cell search procedure, when any finger has not been allocated, RSCP may not be measured. Thus, the wireless terminal may supply operating power to the secondary antenna when the secondary antenna is used in the previous active state, or when the RSSI in the current primary path is less than a preset reference value RSSI_DIVON_TH.

According to the foregoing embodiments of the present disclosure, a scheme is provided in which the wireless terminal determines a driving point in time for the secondary antenna for each operation state (the active state, the idle state, the initial cell search state, or the like).

In the foregoing embodiments, it has been assumed that an RSSI or Ec/Io is measured or an RSCP is calculated.

For example, the wireless terminal may obtain an RSSI in each of the multiple antennas through an automatic gain controller (AGC). The AGC may be provided for each antenna. Generally, the AGC may use an RSSI measured in a received signal for gain control of the received signal. In this case, the wireless terminal may obtain an antenna-specific RSSI through the AGC. The wireless terminal may obtain Ec/Io by combining power values in fingers allocated for respective antennas of the multiple antennas for each antenna. The wireless terminal calculates an antenna-specific RSCP for each of the multiple antennas by using RSSI and Ec/Io measured corresponding to each antenna.

In the following description, the multiple antennas may be classified into chosen antennas and unchosen antennas or candidate antennas and remaining antennas. A chosen antenna is selected in a previous antenna selecting procedure from among the multiple antennas, and an unchosen antenna is not selected in the previous antenna selecting procedure from among the multiple antennas. A candidate antenna is selected as a candidate from among the multiple antennas before antenna selection, and a remaining antenna is an antenna that remains when the candidate antenna is excluded from among the multiple antennas.

Referring back to FIG. 4A, when it is determined that the secondary antenna is not in a driving state in step 412, the wireless terminal selects a primary antenna, in step 414.

If it is determined that the secondary antenna is in a driving state in step 412, the wireless terminal determines whether a finger has been allocated, in step 416. If the finger has not been allocated, the wireless terminal determines whether a current operation state is the idle state, in step 418.

If the current operation state is the idle state in step 418, the wireless terminal compares an RSSI RSSI_unchosen in an unchosen antenna with an RSSI RSSI_chosen in a chosen antenna, in step 420. If the RSSI RSSI_unchosen is greater than or equal to the combination of the RSSI RSSI_chosen and a preset value RSSI_HYS, the wireless terminal selects the unchosen antenna as an antenna to be used, in step 422. If the RSSI RSSI_unchosen is less than the combination of the RSSI RSSI_chosen and the preset value RSSI_HYS, the wireless terminal selects a chosen antenna as an antenna to be used, in step 424.

If it has been determined that the finger has been allocated in step 416 or that the current operation state is not the idle state in step 418, the wireless terminal determines a candidate antenna from among the multiple antennas, in step 426 of FIG. 4B. If the current operation state is the idle state, the wireless terminal may allocate and then deallocate the finger every DRX cycles.

In order to determine the candidate antenna in step 426, the wireless terminal may compare an RSCP RSCP_unchosen in an unchosen antenna with an RSCP RSCP_chosen in a chosen antenna. If the RSCP RSCP_unchosen is greater than or equal to the combination of the RSCP RSCP_chosen and a preset value RSCP_HYS, the wireless terminal determines the unchosen antenna as a candidate antenna. If the RSCP RSCP_unchosen is less than the combination of the RSCP RSCP_chosen and the preset value RSCP_HYS, the wireless terminal determines the chosen antenna as a candidate antenna.

Once the candidate antenna is determined as described above, the wireless terminal determines whether to select the determined candidate antenna or the remaining antenna, in steps 428 through 434.

More specifically, the wireless terminal compares Ec/Io Ec/Io_candidate in the candidate antenna with a preset reference value TH1, Ec/Io_SEL_TH to determine whether the Ec/Io Ec/Io_candidate is greater than the preset reference value Ec/Io_SEL_TH, in step 428. If the Ec/Io Ec/Io_candidate is less than or equal to the preset reference value Ec/Io_SEL_TH, the wireless terminal compares the Ec/Io Ec/Io_candidate in the candidate antenna with Ec/Io Ec/Io_remained in the remaining antenna, in step 430. If the combination of the Ec/Io Ec/Io_candidate and a preset error reference value Ec/Io_HYS is less than the Ec/Io Ec/Io_remained, the wireless terminal selects the remaining antenna as an antenna to be used, in step 434.

If the Ec/Io Ec/Io_candidate is greater than the preset reference value Ec/Io_SEL_TH in step 428, or if the combination of the Ec/Io Ec/Io candidate and the preset error reference value Ec/Io_HYS is greater than or equal to the Ec/Io Ec/Io remained, the wireless terminal selects the candidate antenna as the antenna to be used, in step 432.

As is apparent from the foregoing description, an antenna selection scheme proposed according to embodiments of the present disclosure may reduce a search time while maintaining search performance in a weak electric-field environment.

At least a part of a device (for example, modules or functions thereof) or a method (for example, operations), according to embodiments of the present disclosure, may be implemented with a command stored in a computer-readable storage medium in the form of a program module. When the command is executed by a processor, one or more processors may perform a function corresponding to the command. The computer-readable storage medium may be a memory.

The computer readable recording medium includes a hard disk, a floppy disk, magnetic media (e.g., magnetic tape), optical media (e.g., compact disc read only memory (CD-ROM) or digital versatile disc (DVD)), magneto-optical media (e.g., floptical disk), and a hardware device (e.g., ROM, random access memory (RAM), or flash memory). Further, the program instructions include a machine language code created by a complier and a high-level language code executable by a computer using an interpreter. The foregoing hardware device may be configured to be operated as at least one software module to perform an operation of the present disclosure, or vice versa.

Modules or programming modules, according to embodiments of the present disclosure, may include one or more of the foregoing elements, may omit some of the foregoing elements, or may include additional elements. Operations performed by the modules, the programming modules, or other elements may be executed in a sequential, parallel, repetitive or heuristic manner. Also, some of the operations may be executed in a different order, may be omitted, or may have additional operations.

The present disclosure may be utilized in conjunction with the manufacture of integrated circuits, chip sets, or system-on-chips (SoCs). One skilled in the art would know how to dice wafers and package die to produce integrated circuits. Integrated circuits so manufactured are considered part of this disclosure.

While the disclosure has been shown and described with reference to certain embodiments thereof, it will be understood by those skilled in the art that various changes in form and detail may be made therein without departing from the spirit and scope of the disclosure as defined by the appended claims.

What is claimed is:

1. A wireless terminal in a weak electric-field environment comprising:
   a plurality of antennas comprising a primary antenna and at least one secondary antenna; and
   a communication processor (CP) configured to
   select one of the plurality of antennas to measure a quality of signal with respect to at least one cell around the wireless terminal in a weak electric-field environment, based on whether at least one from among the at least one secondary antenna is in a driving state and whether a finger of a rake receiver has been allocated, and
   perform a cell search through the selected one of the plurality of antennas,
   wherein the driving state is a state in which a signal received through the at least one from among the at least one secondary antenna is delivered to the rake receiver.

2. The wireless terminal of claim 1, wherein the CP is further configured to:
   determine a candidate antenna among the plurality of antennas, if the at least one from among the at least one secondary antenna is in the driving state and the finger has been allocated;
   select the candidate antenna, if a signal quality corresponding to the candidate antenna satisfies a predetermined reference signal quality; and
   select a remaining antenna, excluding the candidate antenna, from among the plurality of antennas, if the signal quality corresponding to the candidate antenna fails to satisfy the predetermined reference signal quality.

3. The wireless terminal of claim 1, wherein, if the at least one from among the at least one secondary antenna is in the driving state and the finger has not been allocated, the CP is further configured to:
   determine whether a signal quality corresponding to an unchosen antenna that has not been selected for a previous cell search among the plurality of antennas is better than a signal quality corresponding to a chosen antenna that has been selected for the previous cell search by a predetermined reference or more;
   select the unchosen antenna if the signal quality corresponding to the unchosen antenna is better than the signal quality corresponding to the chosen antenna by the predetermined reference or more; and
   select the chosen antenna if the signal quality corresponding to the unchosen antenna is not better than the signal quality corresponding to the chosen antenna by the predetermined reference or more.

4. The wireless terminal of claim 1, wherein the CP is further configured to select the primary antenna, if the at least one from among the at least one secondary antenna is not in the driving state.

5. The wireless terminal of claim 1, wherein the CP is further configured to:
   determine that the finger has been allocated if an operation state is an active state; and
   determine that the finger has not been allocated if the operation state is an idle state or a cell search state.

6. A method for searching for a cell in a weak electric-field environment by a communication processor (CP) of a wireless terminal comprising a plurality of antennas, the plurality of antennas comprising a primary antenna and at least one secondary antenna, the method comprising:
   selecting one of the plurality of antennas to measure a quality of signal with respect to at least one cell around the wireless terminal in a weak electric-field environment, based on whether at least one from among at least one secondary antenna is in a driving state and whether a finger of a rake receiver has been allocated; and
   performing a cell search through the selected one of the plurality of antennas, wherein the driving state is a state in which a signal received through the at least one from among the at least one secondary antenna is delivered to the rake receiver.

7. The method of claim 6, wherein selecting the one of the plurality of antennas comprises:
   determining a candidate antenna among the plurality of antennas, if the at least one from among the at least one secondary antenna is in the driving state and the finger has been allocated;
   selecting the candidate antenna, if a signal quality corresponding to the candidate antenna satisfies a predetermined reference signal quality; and
   selecting a remaining antenna, excluding the candidate antenna, from among the plurality of antennas, if the signal quality corresponding to the candidate antenna fails to satisfy the predetermined reference signal quality.

8. The method of claim 6, wherein selecting the one of the plurality of antennas comprises:
   determining whether a signal quality corresponding to an unchosen antenna that has not been selected for a previous cell search among the plurality of antennas is better than a signal quality corresponding to a chosen antenna that has been selected for the previous cell search by a predetermined reference or more, if the at least one from among the at least one secondary antenna is in the driving state and the finger has not been allocated;
   selecting the unchosen antenna, if the signal quality corresponding to the unchosen antenna is better than the signal quality corresponding to the chosen antenna by the predetermined reference or more; and
   selecting the chosen antenna, if the signal quality corresponding to the unchosen antenna is not better than the signal quality corresponding to the chosen antenna by the predetermined reference or more.

9. The method of claim 6, wherein selecting the one of the plurality of antennas comprises:
   selecting the primary antenna, if the at least one from among the at least one secondary antenna is not in the driving state.

10. The method of claim 6, wherein selecting the one of the plurality of antennas comprises:
    determining that the finger has been allocated, if an operation state is an active state; and
determining that the finger has not been allocated, if the operation state is an idle state or a cell search state.

11. A method for searching for a cell in a weak electric-field environment by a communication processor (CP) of a wireless terminal comprising a plurality of antennas, the method comprising:
    determining whether a secondary antenna is in a driving state, wherein the plurality of antennas comprises a primary antenna and the secondary antenna;
    selecting the primary antenna to measure a quality of signal with respect to at least one cell around the wireless terminal in the weak electric-field environment and performing a cell search through the primary antenna, when the secondary antenna is not in the driving state;
    selecting one of the plurality of antennas to measure the quality of signal with respect to the at least one cell around the wireless terminal in the weak electric-field environment based on whether a finger of a rake receiver has been allocated, and based on an operation state of the wireless terminal, and performing the cell search through the selected one of the plurality of antennas, when the secondary antenna is in the driving state,
    wherein the driving state is a state in which a signal received through the at least one from among the at least one secondary antenna is delivered to the rake receiver.

12. The method of claim 11, wherein selecting the one of the plurality of antennas comprises:
    determining a candidate antenna among the plurality of antennas, if the finger has been allocated or the operation state is not an idle state;
    selecting the candidate antenna, if a signal quality corresponding to the candidate antenna satisfies a preset reference signal quality;
    selecting a remaining antenna, excluding the candidate antenna, from among the plurality of antennas, if the signal quality corresponding to the candidate antenna fails to satisfy the preset reference signal quality;
    determining whether a signal quality corresponding to an unchosen antenna that has not been selected for a previous cell search among the plurality of antennas is better than a signal quality corresponding to a chosen antenna that has been selected for the previous cell search by a preset reference or more, if the finger has not been allocated or the operation state is an idle state;
    selecting the unchosen antenna, if the signal quality corresponding to the unchosen antenna is better than the signal quality corresponding to the chosen antenna by the preset reference or more; and
    selecting the chosen antenna, if the signal quality corresponding to the unchosen antenna is not better than the signal quality corresponding to the chosen antenna by the preset reference or more.

13. The method of claim 11, wherein selecting the one of the plurality of antennas comprises:
    determining that the finger has been allocated, if the operation state is the active state; and
    determining that the finger has not been allocated, if the operation state is an idle state or a cell search state.

14. A wireless terminal in a weak electric-field environment comprising:
    a plurality of antennas comprising a primary antenna and a secondary antenna; and
    a communication processor (CP) configured to:
    determine whether the secondary antenna is in a driving state;
    select the primary antenna to measure a quality of signal with respect to at least one cell around the wireless terminal in the weak electric-field environment and perform a cell search through the primary antenna, when the secondary antenna is not in the driving state; and
    select one of the plurality of antennas to measure the quality of signal with respect to the at least one cell around the wireless terminal in the weak electric-field environment based on whether a finger of a rake receiver has been allocated, and based on an operation state of the wireless terminal, and perform the cell search through the selected one of the plurality of antennas, when the secondary antenna is in the driving state,
    wherein the driving state is a state in which a signal received through the at least one from among the at least one secondary antenna is delivered to the rake receiver.

15. The wireless terminal of claim 14, wherein the CP is further configured to:
- determine a candidate antenna among the plurality of antennas, if the finger has been allocated or the operation state is not an idle state;
- select the candidate antenna, if a signal quality corresponding to the candidate antenna satisfies a preset reference signal quality;
- select a remaining antenna, excluding the candidate antenna, from among the plurality of antennas, if the signal quality corresponding to the candidate antenna fails to satisfy the preset reference signal quality;
- determine whether a signal quality corresponding to an unchosen antenna that has not been selected for a previous cell search among the plurality of antennas is better than a signal quality corresponding to a chosen antenna that has been selected for the previous cell search by a preset reference or more, if the finger has not been allocated or the operation state is an idle state;
- select the unchosen antenna, if the signal quality corresponding to the unchosen antenna is better than the signal quality corresponding to the chosen antenna by the preset reference or more; and
- select the chosen antenna, if the signal quality corresponding to the unchosen antenna is not better than the signal quality corresponding to the chosen antenna by the preset reference or more.

16. The wireless terminal of claim 14, wherein the CP is further configured to:
- determine that the finger has been allocated, if the operation state is the active state; and
- determine that the finger has not been allocated, if the operation state is an idle state or a cell search state.

* * * * *